No. 659,360. Patented Oct. 9, 1900.
E. C. BURR, J. C. H. STUT & J. W. ATKINSON.
LIME TANK FOR SUGAR FACTORIES.
(Application filed Nov. 27, 1899.)
(No Model.) 2 Sheets—Sheet 2.

Witnesses
Walter F. Vaux.
D. B. Richards

Inventors
Edmund C. Burr; John C. H. Stut & John W. Atkinson.
by Wm. F. Booth,
their Attorney.

UNITED STATES PATENT OFFICE.

EDMUND C. BURR, OF SAN FRANCISCO, JOHN C. H. STUT, OF OAKLAND, AND JOHN W. ATKINSON, OF SANTA MARIA, CALIFORNIA.

LIME-TANK FOR SUGAR-FACTORIES.

SPECIFICATION forming part of Letters Patent No. 659,360, dated October 9, 1900.

Application filed November 27, 1899. Serial No. 738,477. (No model.)

*To all whom it may concern:*

Be it known that we, EDMUND C. BURR, residing at the city and county of San Francisco, JOHN C. H. STUT, residing at Oakland, Alameda county, and JOHN W. ATKINSON, residing at Santa Maria, Santa Barbara county, State of California, citizens of the United States, have invented certain new and useful Improvements in Lime-Tanks for Sugar-Factories; and we do hereby declare the following to be a full, clear, and exact description of the same.

Our invention relates generally to the apparatus which in beet-sugar factories is concerned with the preparation and supply of milk of lime to the juice in the carbonating-pans.

Our invention consists in the novel combination and arrangement of lime-settling tanks, which we shall hereinafter describe and illustrate.

The object of the invention is to provide for the continuous supply and purification of the milk of lime. The lime is naturally mixed with grit and impurities, and when the water is added in the slaker and the milk of lime thus formed is passed on into the lime-settling tanks, from which it is used to supply the pipe system to the measuring-tanks and carbonators, it is necessary to allow these foreign matters and impurities to settle, at the same time keeping the liquid stirred to properly hold the lime in suspension. From the lime-settling tanks the milk of lime is pumped continuously to and circulates through the pipe-supply system, there being a necessity for continuous operation to keep the lime properly mixed. The lime-tanks have, however, to be cleaned out quite frequently, and under the system heretofore used this requires a stoppage of the operation, which is very undesirable. By our arrangement and combination of the lime-tanks we are enabled to clean any one out without shutting off the others, which may continue to receive the lime, purify it by settling its impurities, keep it stirred, and continuously supply it to the pipe system.

Figure 1:
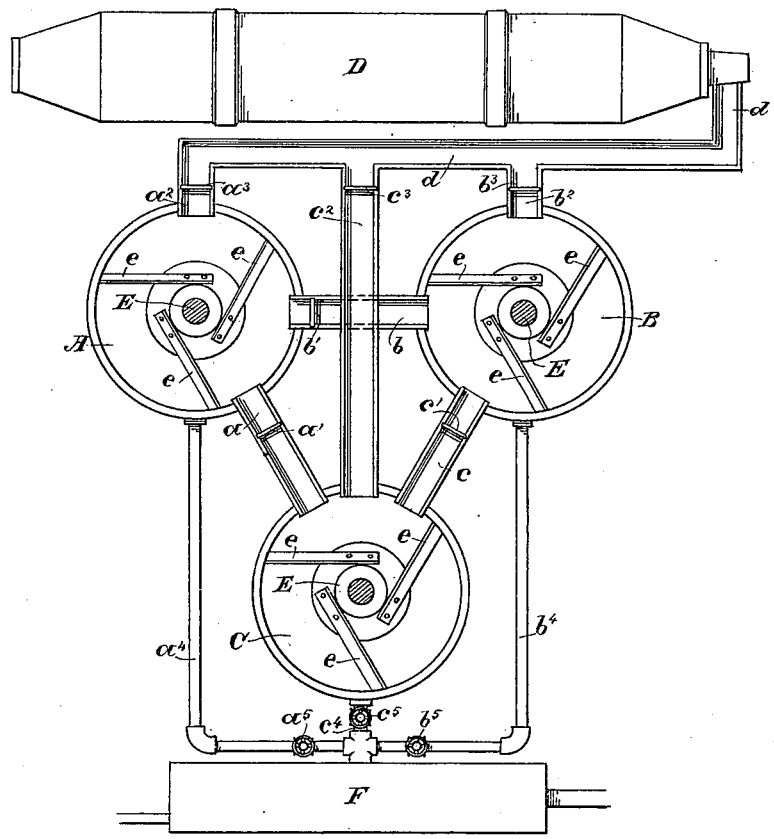
Figure 2:
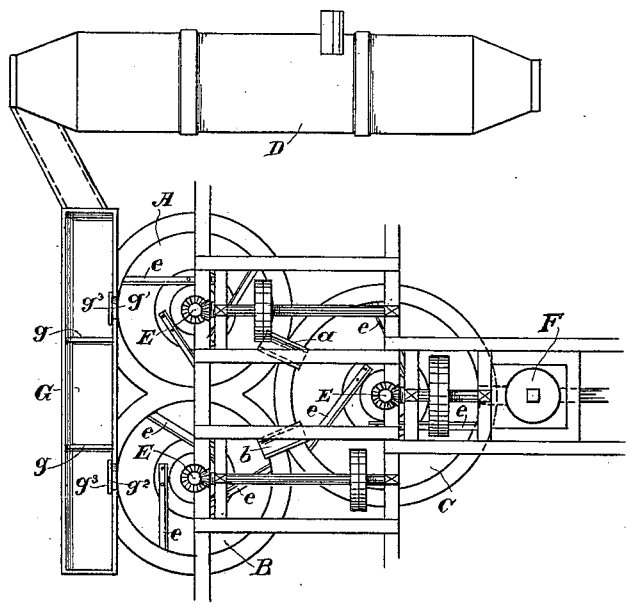
Figure 3:
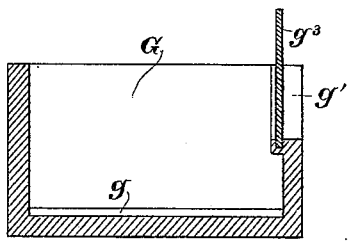

Referring to the accompanying drawings, Figure 1 is a plan of our lime-settling tanks. Fig. 2 is a plan of a modification of same. Fig. 3 is a cross-section of trough G.

We have here shown a group of lime-settling tanks, three in number, though it may comprise more, if desired. One of these tanks is designated by A, a second by B, and a third by C. The three tanks discharge into each other, as by overflows $a$, $b$, and $c$, which are controlled by gates or other suitable valves $a'$ $b'$ $c'$.

D indicates in outline the slaker, in which the milk of lime is made. This discharges into a channel $d$, which communicates with a channel $a^2$ to tank A, and with a channel $b^2$ to tank B, and with a channel $c^2$ to tank C, each of said channels being independently and separately controlled by suitable gates or other valves designated by $a^3$, $b^3$, and $c^3$, respectively.

In each of the three tanks A, B, and C is a shaft E, driven by suitable power connections unnecessary to show, and each carries on its lower end stirrer-arms $e$.

F represents a pump which takes the contents from any of the tanks. This pump is to serve the usual purpose of passing the milk of lime through the customary pipe-supply system, unnecessary herein to show, to the measuring-tanks of the carbonators, (not shown,) returning the surplus continuously. This pump is connected with each of the tanks by pipes $a^4$, $b^4$, and $c^4$, respectively, and each pipe is separately controlled by cocks $a^5$, $b^5$, and $c^5$.

The operation is this. The milk of lime being made in the "slaker" is fed through one or more of the channels $a'$ $b'$ $c'$ to the intercommunicating three tanks A, B, and C, in each of which the impurities settle, while the slow but steady motion of the stirrers keeps the lime in suspension. The pump F draws from any of the three tanks, as desired, this being effected by proper manipulation of the cocks $a^5$, $b^5$, and $c^5$. Now if tank A requires cleaning the channel $a^2$ is closed by its gate $a^3$ and the overflow communications $a$ and $b$ are cut off by their gates $a'$ and $b'$. These effectually cut tank A out from the group, and the workman can clean it out. During this time the operation of supplying tanks B and C continues, and from either, according as the communication of the pump may be, the pipe system is supplied with its necessary continuous flow. In like manner tank B may be cut out of the system and cleaned when required, and so, too, tank C and any other members of a large group of similarly intercommunicating settling-tanks. A simpler arrangement, however, but involving a similar mode of operation with like results, is shown in Fig. 2, wherein of the group of three settling-tanks the one marked C may be said to be common to A and B, because each of the latter discharge into it by overflows, such as shown at $a$ and $b$.

G is an inclined supply-trough, which may or may not have in its bottom riffles $g$ to catch as much of the settling impurities from the milk or lime as may be possible by such means. This trough has an outlet-opening $g'$ into tank A and another outlet-opening $g^2$ into tank B. Each of these openings is to be separately controlled—as, for example, by means of a gate $g^3$. These outlet-openings $g'$ and $g^2$ are a little above the bottom of the trough in order to afford a space in the lower portion to catch and retain the settled impurities. The pump F communicates with tank C. If tank A require cleaning, the outlet-opening $g'$ in trough G, which supplies said tank, is closed by its gate, thus cutting out tank A, so that it may be cleaned. Meanwhile the operation of supplying tank B continues, and it continues to supply tank C, and from the latter the pipe system is supplied with a continuous flow. In like manner tank B may be cut out of the group and cleaned, and so may any other members of a large group.

Having thus described our invention, what we claim as new, and desire to secure by Letters Patent, is—

1. In combination with a milk-of-lime supply, two lime-settling tanks A, B, each communicating with said supply, means for controlling the communication with each tank, a third lime-settling tank communicating with each of the tanks A, B, and a pump communicating with the third tank and from which it draws the milk of lime, substantially as and for the purpose described.

2. In combination with a milk-of-lime supply, a group of lime-settling tanks two of which A, B, communicate with said supply and each of which communicates by an overflow with a third tank, means for separately controlling the communication from said supply to said two tanks A, B, and a pump connecting with said group of tanks and adapted to draw the milk of lime therefrom, substantially as and for the purpose set forth.

3. In combination with a milk-of-lime supply-conduit $d$, two lime-settling tanks A, B, each having a valve-controlled connection with said supply-conduit $d$, a third tank C, an overflow from each of the tanks A, B, to the tank C, means for separately controlling said overflow, a pump communicating with the third tank C and from which it draws the milk of lime and adapted to supply a pipe system, substantially as described.

In witness whereof we have hereunto set our hands.

EDMUND C. BURR.
JOHN C. H. STUT.
JOHN W. ATKINSON.

Witnesses as to signatures of Burr and Stut:
D. B. RICHARDS,
WALTER F. VANE.

Witnesses as to the signature of Atkinson:
A. L. PARSONS,
W. F. KELLEY.